United States Patent
Potter et al.

(10) Patent No.: US 8,370,907 B1
(45) Date of Patent: Feb. 5, 2013

(54) INTERNET ENABLED MONITORING AND CONTROL DEVICE

(75) Inventors: Jeffrey P. Potter, Cambridge, MA (US); Tinsley A. Galyean, Cambridge, MA (US)

(73) Assignee: DeviceCo LLC, Cambridge, MA (US)

( * ) Notice: Subject to any disclaimer, the term of this patent is extended or adjusted under 35 U.S.C. 154(b) by 1446 days.

(21) Appl. No.: 11/943,281

(22) Filed: Nov. 20, 2007

(51) Int. Cl.
- *G06F 7/04* (2006.01)
- *G06F 17/30* (2006.01)
- *H04L 29/06* (2006.01)
- *H04L 9/32* (2006.01)
- *H04N 7/173* (2011.01)
- *G10L 21/00* (2006.01)
- *A61B 5/00* (2006.01)
- *H04M 11/04* (2006.01)
- *G06F 11/30* (2006.01)
- *G06F 11/32* (2006.01)
- *H04N 1/00* (2006.01)
- *G05B 23/02* (2006.01)
- *H04Q 9/00* (2006.01)
- *G01C 21/00* (2006.01)

(52) U.S. Cl. .............. 726/5; 726/28; 725/108; 704/274; 713/151; 713/176; 600/301; 455/404.1

(58) Field of Classification Search ................ 726/5, 28; 600/301; 713/176, 151
See application file for complete search history.

(56) References Cited

U.S. PATENT DOCUMENTS

| | | | |
|---|---|---|---|
| 2003/0196092 A1* | 10/2003 | Raley et al. | 713/176 |
| 2005/0060534 A1* | 3/2005 | Marvasti | 713/151 |
| 2010/0016683 A1* | 1/2010 | Lemmers et al. | 600/301 |

FOREIGN PATENT DOCUMENTS

GB 2449518 A * 11/2008

OTHER PUBLICATIONS

Ka Yang; Subramanian, N.; Daji Qiao; Wensheng Zhang; "EagleVision: A pervasive mobile device protection system"; Mobile and Ubiquitous Systems: Networking & Services, MobiQuitous, 2009. MobiQuitous '09. 6th Annual International Publication Year: Jan. 2009, pp. 1-10.*

* cited by examiner

*Primary Examiner* — Kambiz Zand
*Assistant Examiner* — Courtney Fields
(74) *Attorney, Agent, or Firm* — Law Offices of Paul E. Kudirka

(57) ABSTRACT

A connection between a monitoring device and a remote user is accomplished securely over the Internet by using a communication channel with public/private key encryption to connect the two locations and by performing authentication of a user at the local monitoring device rather than at a device server at the remote location, thereby effectively removing the device server as vulnerable point for attack. In particular, when a remote user attempts to log in, via a web browser or interactive telephone system, the encrypted channel is established using the public/private key of the device and the device server proxies the log-in request to the monitored device. The device itself is then responsible for granting or denying access.

38 Claims, 11 Drawing Sheets

INTERNET ENABLED MONITORING AND CONTROL DEVICE

BACKGROUND

Monitoring and control devices provide their users with economic savings and an improved quality of life by automating the process of watching over and reacting to some physical characteristics of the surrounding world. In some industries, such as residential security, automated monitoring provides reassurance of the safety of possessions from burglary and fire. In other applications, such as industrial manufacturing, the cost of installing and maintaining automated control systems is cheaper than the equivalent cost of labor. Regardless of the type of environment or the benefits conferred, automated monitoring and control devices provide a practical solution to the problem of maintaining a desired state.

All monitoring and control systems—not just those in the security or manufacturing industries—relieve their users from having to manually check that a situation is "normal." In the security industry, most current systems raise an alert when the environment changes from its "normal" state. In many systems, the monitoring system automatically corrects the issue raised by the alert. For example, in steel manufacturing, monitoring systems are used to correct the thickness of steel plates by using measurements from the just-extruded portions of the plate to adjust controls.

To date, the typical method of defining a system's current "normal" state—and by extension, defining what events should trigger an alert or correction—has been, in effect, to specifically tell the system in what state the system is "normal". For example, in residential security applications, the standard mechanism for defining the normal state is for a user or a security technician to directly interact with the system. The user interacts with the system via a keypad on the system by keying in an access code and then selecting a state, such as "arm" or "disarm." The technician usually interacts with the system in order to change the system configuration by physically moving electrical jumpers or connecting wires, by programming the system with a computer, via a plug-in interface, or by replacing a pre-programmed memory chip in the system. Other monitoring systems, such as those used in manufacturing or industrial applications, may not require any configuration for what constitutes "normal" (e.g. fire sensors, water/flooding sensors), but these systems are in essence the same, in that they require an initial configuration in order to add, remove or change sensors and to specify what actions will be taken when a particular pattern of sensor outputs occurs.

One of the biggest problems with conventional monitoring systems (including alarm/security systems, sprinkler systems, and VCRs) is the difficulty posed in configuring the device to perform as desired. For the vast majority of users, an ideal monitoring system would be one whose day-to-day operation is not even considered, such as a thermostat. It is installed, and performs its duty indefinitely. In this type of system, the user never has to initially configure or subsequently define the inputs that the system should monitor or control. This "zero configuration" approach—where users add input sensors and output devices but are relieved of the chore of creating the rules for those inputs and outputs—still provides the benefits offered by monitoring system while removing the difficulties of configuring the components.

One approach to providing such a system is to configure the system from an off-site location, such as a central monitoring station where trained technicians are available. In this type of system, the central monitoring station receives an alert when a physical change has been made to the system, such as the addition or removal of a sensor or output device. A technician then programs the system remotely in order to correctly update the system.

An alternative approach is to use logic that "learns" the normal state of its environment. An alarm system constructed in accordance with this approach would continuously monitor its environment and determine occupancy patterns in order to distinguish between authorized and unauthorized users. A sprinkler system constructed in accordance with this approach would determine if watering is needed with ground moisture sensors and remote data feeds detailing forecasted weather and seasonal information. Such a system would learn the right amount of water to provide—even skipping watering at times when rainfall is imminent, or providing extra water in the early morning on days that are expected to be hot and dry. Learning systems typically require increased amounts of storage and computation to correctly sense and learn environmental patterns. In order to avoid placing large amounts of storage and computing power at the monitored location, with the attendant costs, and to allow remote data to be used in the calculations, it would be desirable for the monitored location to communicate with a remote location where the storage and computational power and remote data feeds are located.

One problem with both of the aforementioned approaches is that they require a secure communication link between the monitored location and a remote site.

Typical communication methods, such as telephone lines, have proved to be vulnerable to determined attackers. A particularly attractive communication alternative is the Internet, since it is becoming more and more widely available. However, the Internet is also relatively insecure and subject to attack at multiple locations. In addition, some method must be used to ensure the security of the remote site itself. If this remote site is an automated server, it may also be subject to compromise in a variety of ways.

SUMMARY

In accordance with the principles of the invention, communication between a monitored location and a remote location is accomplished securely over the Internet by using a communication channel with public/private key encryption to connect the two locations and by performing authentication of a user at the local monitoring device rather than at a device server at the remote location, thereby effectively removing the device server as vulnerable point for attack. In particular, when a user attempts to log in, via a web browser or interactive telephone system, the device server proxies the log-in request to the monitored device via the previously-established encrypted communication channel. The device itself is then responsible for granting or denying access. Upon a successful authentication, the device creates a session token for the device server to use for the duration of the user interaction. The device server does not retain passwords of users currently logged in. Thus, the necessary data that the device server requires to be functional is a list of valid usernames and a list of public keys of the devices associated with each username. This arrangement prevents an attacker, such as administrators or unauthorized users, with access to the device server from viewing or changing data at any connected monitoring system.

In one embodiment, the inventive monitoring device can be attached to an existing monitoring system to provide increased capabilities for the monitoring system.

In another embodiment, a "heartbeat" system that is used to prove that the monitoring device is connected to the remote device server and to prevent a would-be attacker from cutting a wire to silence an alert can be verified by a third-party. More specifically, a third-party system may ask the device server at the remote location for proof of the device heartbeat, causing the latter device server to ask the device itself to respond with a cryptographically signed message that the third-party system can then verify. In this manner, even if the remote device server is compromised, a notification for a lost device-server connection can still be received by the third party system.

In still another embodiment, notifications generated by the monitoring device can be sent through any arbitrary server, for example, a web server, SMTP server, or phone server, for distribution to a centralized location or directly to an end user. This arrangement prevents an attack on a specific notification server from potentially affecting notifications.

In yet another embodiment, device configuration changes require on-premises validation. In this arrangement, a remote device server is used to configure actions, contacts, and alerts in the device and the device can be set to require a user to press a physical button on the device within a fixed amount of time from the configuration change. This arrangement prevents an offsite user from making unauthorized changes or viewing sensitive data.

In another embodiment, information relating to the history of the monitoring device is stored off-site, for example, on the remote device server, such that destruction or theft of the monitoring device does not remove evidence of the status of the device and its environment. In order to prevent unauthorized access to the data, the off-site data however is stored in an encrypted format so that access requires a password known only to the user and/or authorized personnel.

In still another embodiment, separate systems are used for sensing inputs and for performing computations with those inputs. Thus, if the computation system fails, inputs occurring during the downtime continue to be monitored via the separate sensing system. The sensing system can also be arranged to report not only the current state of an input but also if that input has been in any other states since last queried.

In another embodiment, a connection can be established between two monitoring devices located at different physical locations in order to send encrypted information through a device server. The connection is established in such a fashion that the data is encrypted end-point to end-point without having to configure additional encryption, and without the device server being able to access the unencrypted data. The connection is established when an initiator device makes a request to the device server to bridge to a target device. In response, the device server sends the request, along with the public key of the initiator device, to the target device. The target device then verifies the received public key against a local list of allowed initiator devices. If the initiator device is authorized, the target device sends its public key to the device server, which, in turn, sends the key back to the initiator device. Once the initiator and target device have exchanged public keys, a standard SSL connection is established between the two devices, proxied through the device server, which is, at that point, incapable of decrypting the messages.

DETAILED DESCRIPTION

Figure 1:
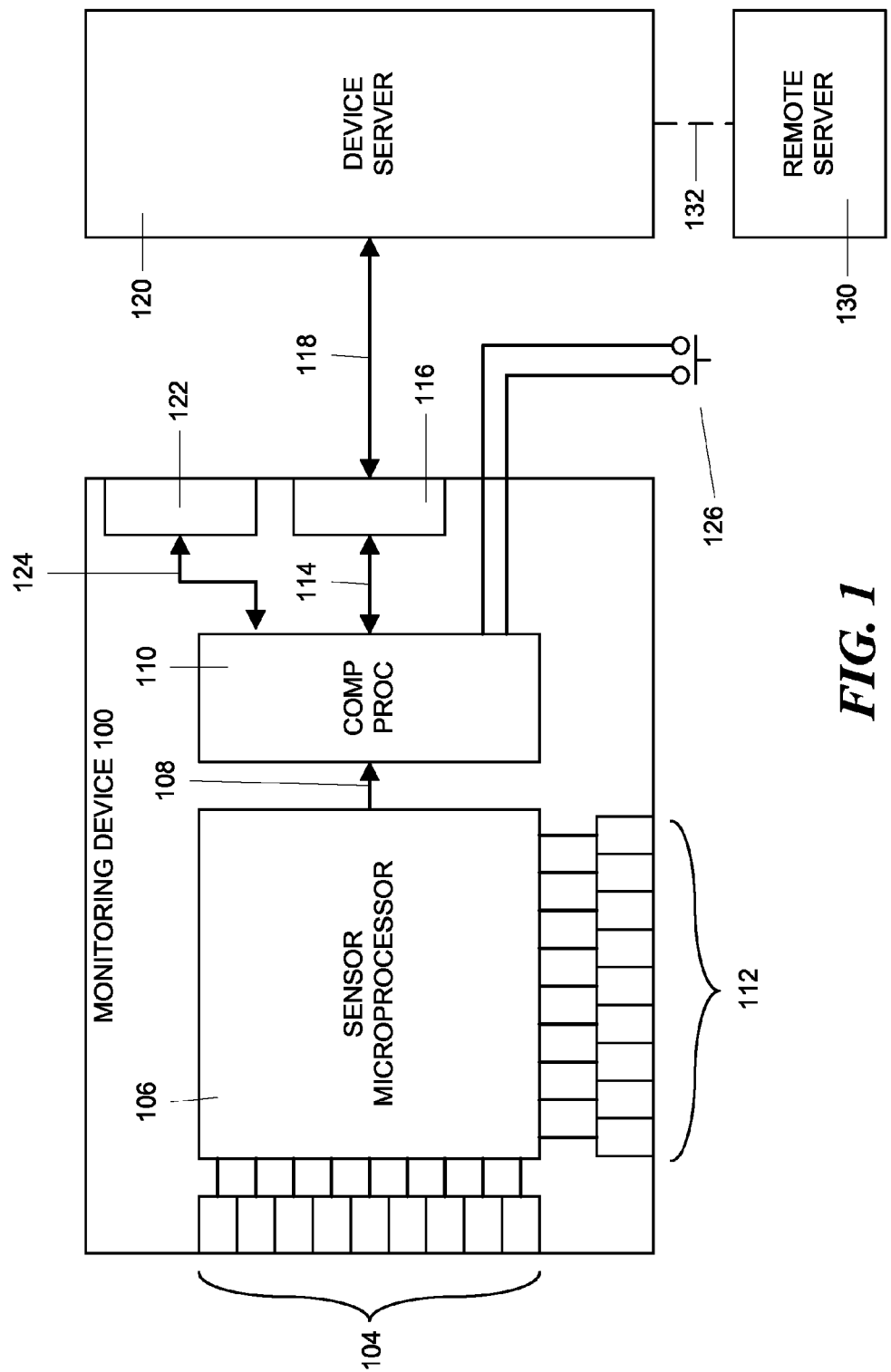
FIG. 1 is a block schematic diagram that illustrates the overall internal architecture of a monitoring device constructed in accordance with the principles of the invention.

FIG. 1 shows a block diagram of an illustrative monitoring device 100 constructed in accordance with the principles of the invention. The device 100 has a sensor microprocessor 106 and a separate computation and communication microprocessor 110. The sensor microprocessor 106 has a plurality of internal analog-digital converters (not separately shown in FIG. 1). Each analog converter is connected to one of a plurality of inputs 104 that can accept voltages in a predetermined range, such as 0 to 36 volts. The sensor microprocessor 106 is programmed to control each of the analog to digital converters to periodically sample and digitize its respective input voltage. Upon a query from microprocessor 110, the digitized voltage values can then be transferred, via bus 108, from microprocessor 106 to microprocessor 110 and read by software in microprocessor 110. The advantage of using separate microprocessors 106 and 110 for sensing inputs and outputs and for performing computations with those inputs is that, if the computation microprocessor 110 fails temporarily, inputs occurring during its downtime continue to be monitored via the separate sensing microprocessor 106. The sensing microprocessor 106 can also be programmed to report not only the current state of an input but also if that input has been in any other states since last queried. This latter capability allows the device to determine whether an alarm state occurred during the time that the computation and communication microprocessor was inoperative.

The sensor microprocessor 106 has a plurality of outputs 112 that are controllable in software and operate as standard relay contacts, either open or closed. This type of output allows the device 100 to be wired as part of another hardware device, such as an alarm panel. The monitoring device 100 will then appear as a set of switches to that other device. The device 100 can change various ones of outputs 112 based on inputs 104 from other local devices or sensors, programmed timers, or requests from device server 120 or indirectly from the user.

The device 100 also has an Ethernet port 116 to which the computation and communication microprocessor 110 is connected, via bus 114. Port 116 allows the device 100 to be connected to a network, schematically shown as network 118. Network 118 could be a LAN or a WAN, such as the Internet. If the network 118 uses Internet Protocol (IP) addresses, then the device 100 may obtain a dynamically assigned IP address from a Dynamic Host Configuration Protocol (DHCP) server located within the network 118 (not shown in FIG. 1). The DHCP is a conventional Internet protocol that resides on the DHCP server and on the computation and communication computer 110. In a typical DHCP configuration, computer 110 is configured to request an IP address from the DHCP server in order to connect to the Internet 118. Once connected to the network 118, the device 100 can connect to a device server 120 as discussed below. Each device has a public/private key pair stored internally. The private key never leaves the device, so no one else can pretend to be that device.

Device 100 also has an RS-232 connector 122 which communicates with microprocessor 110 via bus 124, so that peripherals, such as an RS232 port in an alarm panel (not shown in FIG. 1), can be connected and made remotely accessible. Other connectors that handle additional protocols, such as Universal Serial Bus (USB), Ethernet and RS-432 protocols, can also be added.

Device 100 further has a push button 126 connected to microprocessor 110 so that software running on microprocessor 110 can verify the physical presence of a user for some operations. For example, a user can request (via the device server) that a password or a PIN number be reset. Such a request could require the user to press the physical button 126 within a predetermined time before or after the request has been sent thus providing "proof" that the user is local to the device and is approving an action.

Figure 2:
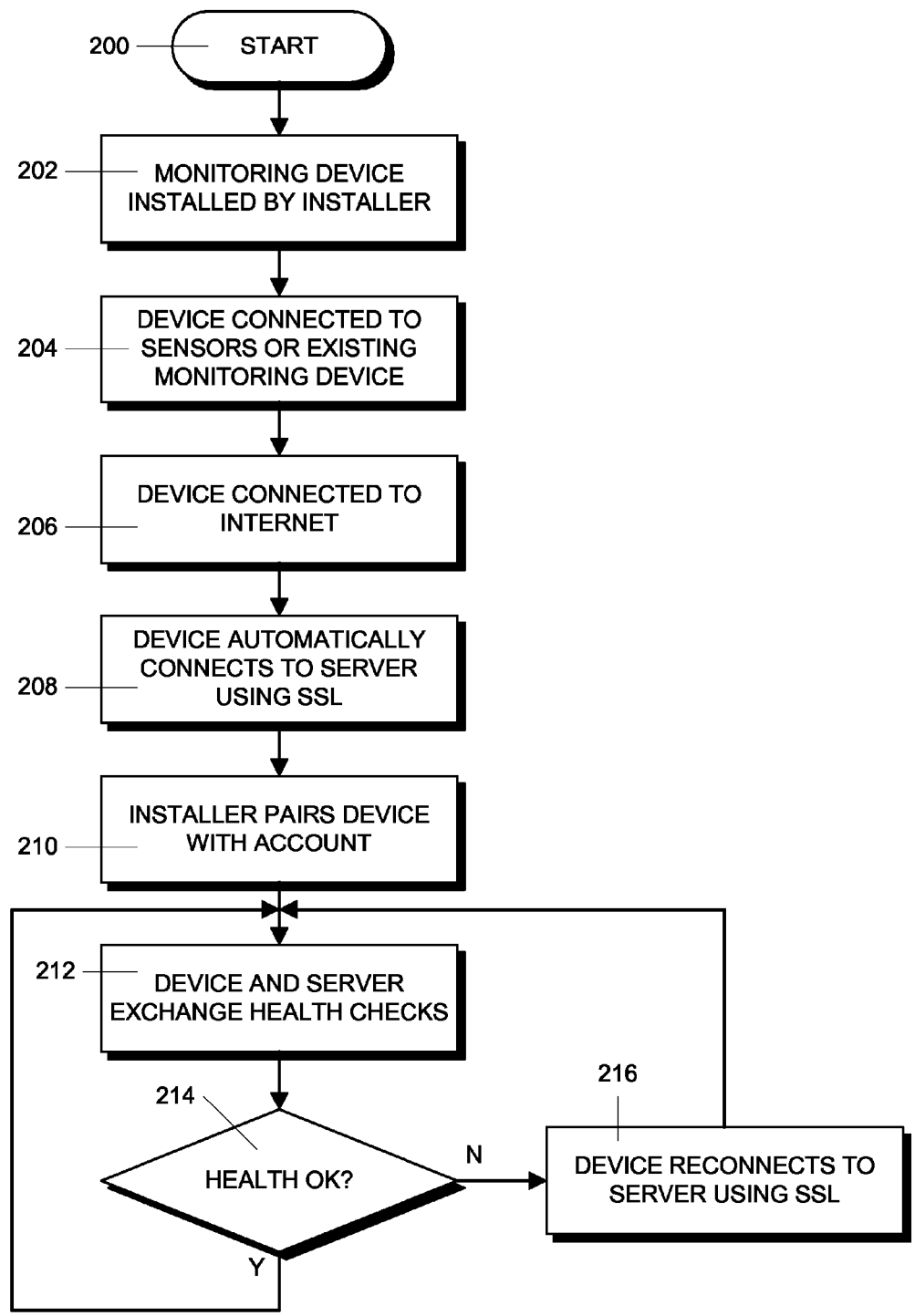
FIG. 2 is a flowchart showing the steps in an illustrative process for installing a monitoring device and establishing a connection between the monitoring device and a device server.

In order to use the device 100, it is first installed at a monitoring location. This process is illustrated in the flow chart shown in FIG. 2 and begins in step 200. In step 202, an alarm system installer installs the monitoring device. The device may be installed as a "stand-alone" device or can be connected to an existing device, for example, by connecting the device to a homeowner or business alarm panel. In step 204, the device is connected to sensors or an existing monitoring device. For example, if the device is connected to an existing alarm panel, wires for "alarm tripped", "fire tripped", etc. are run between the alarm panel and the device connecting the wires to the inputs 104 of the device. These wires are monitored by detecting a very low voltage; so that if zero voltage is detected, then it can be determined that the connection between the device and the panel has failed. Such connections to the primary sensors provide a secondary means of monitoring, in case primary system fails or is circumvented. The connections can also create additional functionality, such as remote control. The connection can also add history/event logging to systems that don't have that, allow for multiple users and allow for programmable timers/triggers.

Next, in step 206, the device is connected to the Internet, whereupon it automatically connects to a device server in step 208. Such a connection 118 to device server 120 is shown in FIG. 1. This connection is made using a Secure Socket Layer (SSL) in a conventional fashion, using RSA certificates for both the device server and the client. Using SSL certificates allows the client to determine the device server is legitimate, allows the device server to determine the client is legitimate and also allows the device server to identify the client by using the public key of the client. More particularly, the device server can verify that the client is legitimate without having to store any private key that could be used to compromise the client in the event that the device server is compromised. Once the connection between the monitoring device and the device server is established, it is kept open continuously.

In step 210, the installer then logs in to a predetermined website and pairs the device with an account, for example, by means of a serial number on the back of the device to relate that device to a new account. The device server maintains a list of account IDs or usernames and their associated devices. After the account has been established in step 212, the device and the device server periodically exchange health-checks, which exchange enables the device server to "supervise" the connection and determine if the client has gone "off-line." If the connection health is okay as determined in step 214, the process proceeds back to step 212 where another health check is made after a predetermined time period. Alternatively, if the connection health is not okay, as determined in step 214, then the process proceeds to step 216 where the device reconnects to the device server using the SSL protocol. In addition, if the server does not detect a reconnection within a user-specified period of time, an offline alert may be sent to the user.

It is important to note that the monitoring and control device connects outward to the device server, and then remains connected, as opposed to the device server contacting the device on an as-needed basis. Managing the server/client communication this way allows the device to work behind firewalls and "home broadband routers" without requiring those devices to be configured to allow inbound connections.

The connection between the device 100 and the device server 120 can be monitored via a "heartbeat" mechanism. Specifically, during connection setup the device server 120 sends the device 100 a predetermined "heartbeat" time interval. After the connection is established, the device server 120 periodically sends a heartbeat message at the end of heartbeat time interval. If the connection is intact, the device 100 acknowledges and replies to the heartbeat message. However, in the event that the device 100 does not receive the heartbeat message within the heartbeat interval (plus some tolerance threshold), the device 100 assumes the connection has been broken, drops the connection, and attempts to re-establish the connection. Similarly, in the event that the server 120 does not get a reply from the device 100 within a predetermined threshold, the server 120 assumes the connection has been broken, drops the connection, and marks the device as offline.

When it is in an offline mode, device 100 can begin doing a pre-programmed sequence of events or continue with scheduled programming. Server 120, after determining that a device has been offline for a specified amount of time, can begin to send offline notifications as configured by the user and as described below.

Figure 3:
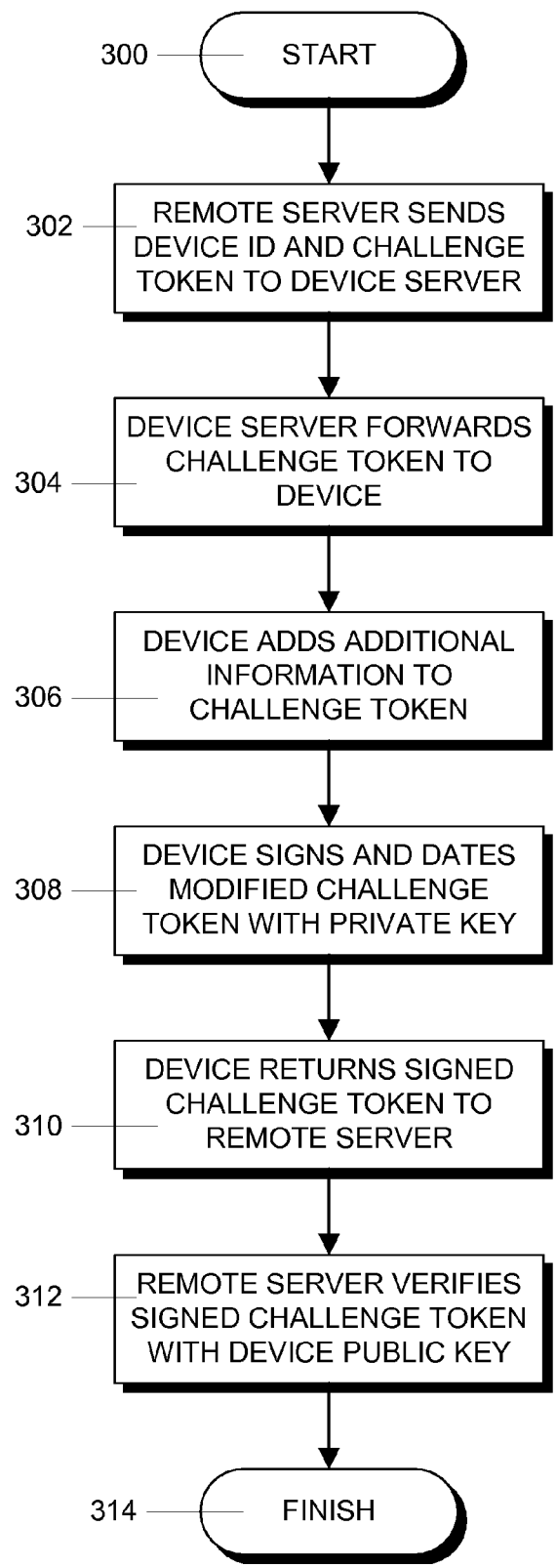
FIG. 3 is a flowchart showing the steps in an illustrative process that a remote server uses to establish the existence of a connection between a device and a device server.

In accordance with the principles of the invention, while the device 100 is connected to the server 120, at any time a remote system can verify that the connection between device 100 and server 120 exists. The process of verifying the connection is shown in FIG. 3. This process begins in step 300 and proceeds to step 302 where a remote system 130 which has the public key (of a public key/private key pair) and device ID of device 100 stored therein, contacts device server 120 as indicated schematically by connection 132, and sends the device ID sends a request for proof that the connection 118 between device 100 and server 120 exists. This request includes a "challenge" token that the remote server creates. Next, in step 304, device server 120 forwards the challenge token to device 100 (the device identified by the device ID).

In step 306, if device 100 accepts the challenge, it adds additional information (such as additional text) to the message in order to prevent an attacker from re-using a response in the event that a challenge can be forged. Then, in step 308, device 100, signs and dates the modified challenge token using the private key (such as one from RSA) of the aforementioned public/private key pair.

Next in step 310, device 100 sends the signed modified challenge token to device server 130, which then returns the signed token to the remote server 130 over the connection 132. Finally, in step 312, the remote server 130 verifies the signed challenge token in the conventional fashion using the public key which it possesses. The process then ends in step 314.

Once the monitoring device is connected to the device server, it can be controlled in a secure manner by a remote user. Such a connection is shown in FIG. 4 and FIGS. 5A and 5B show the steps in a process by which the remote user can connect to the monitoring device through the device server in such a manner that the monitoring device is not compromised even if the device server becomes compromised.

Figure 4:
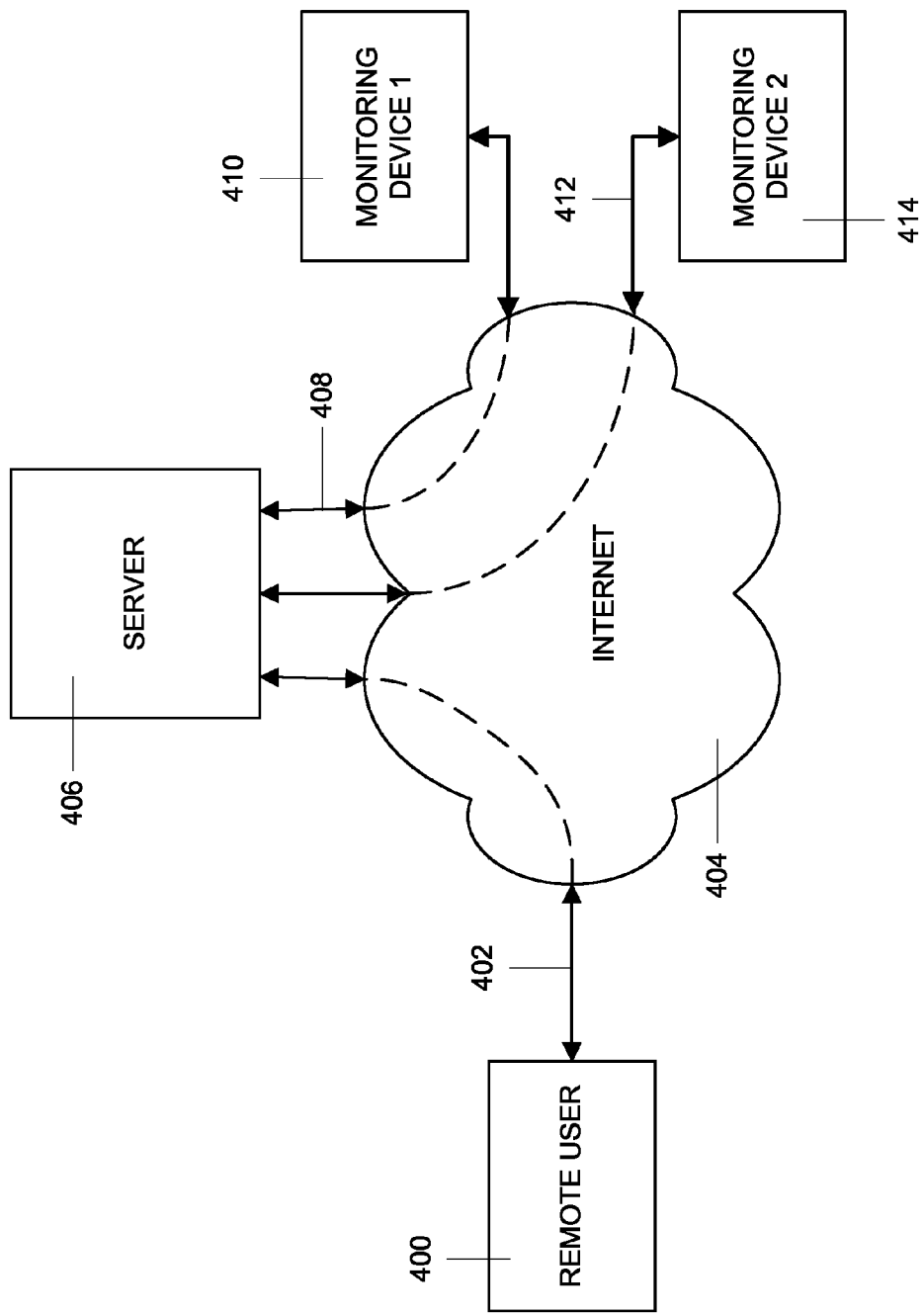
FIG. 4 is a block schematic diagram illustrating the establishment of a connection between a remote user and a monitoring device via the device server.
Figure 5A:
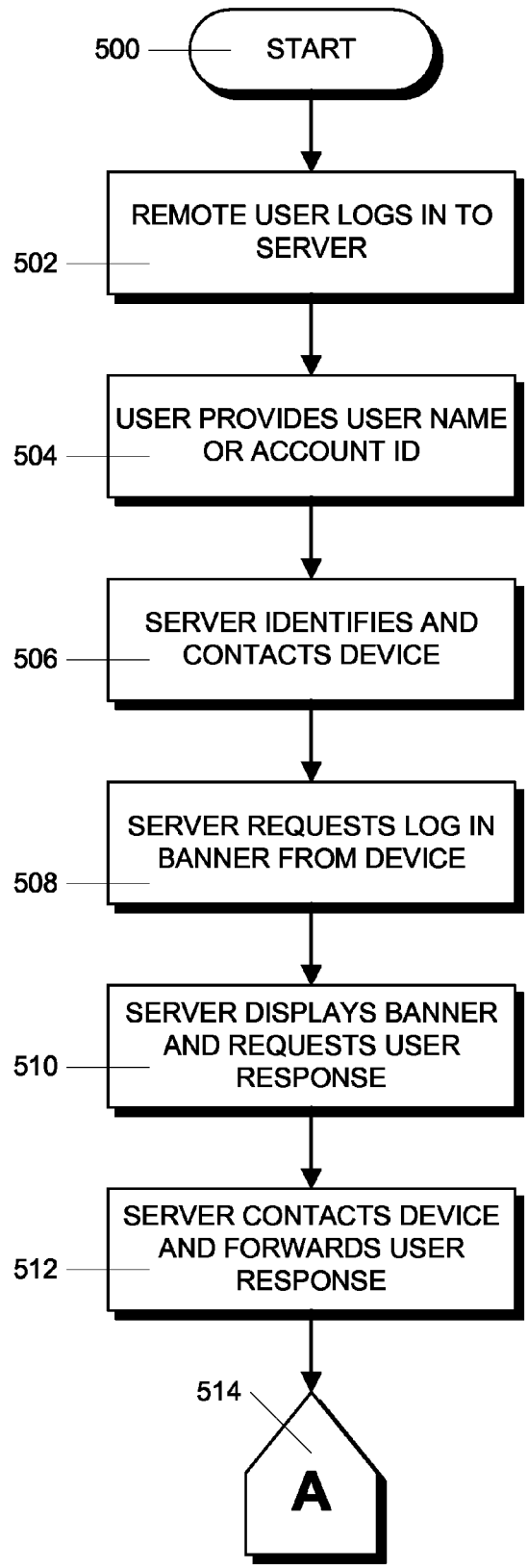
FIGS. 5A and 5B, when placed together, form a flowchart showing the steps in an illustrative process of establishing the connection shown in FIG. 4.
Figure 5B:
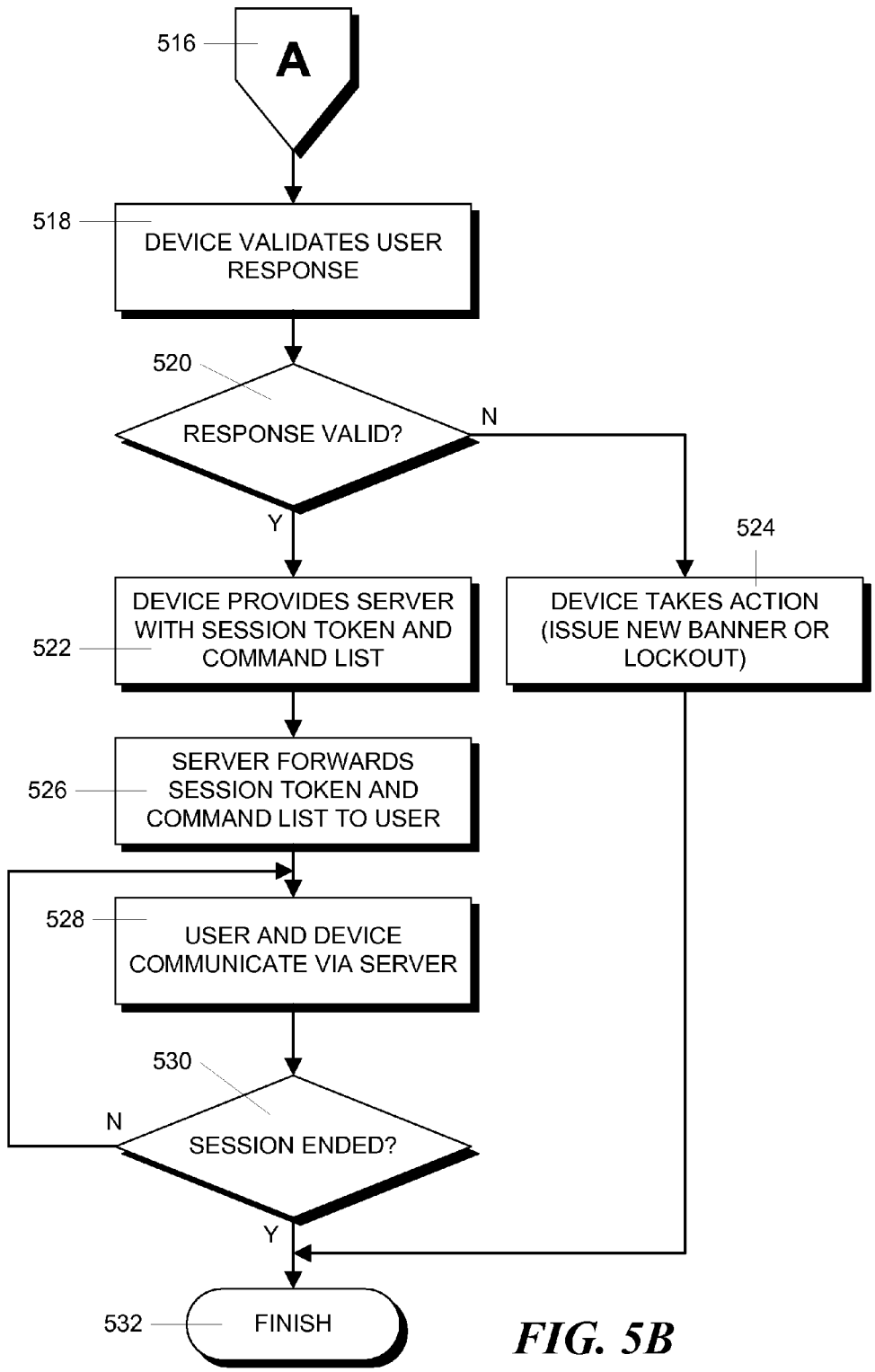

FIG. 4 illustrates in schematic fashion, a connection between a remote user 400, via device server 406, to one of monitoring devices 410 and 414. In this arrangement, a connection 408 between monitoring device 1 (410) and device server 306 through the Internet 304 has been established and is being maintained in the manner described above. Similarly a connection 312 between device server 306 and monitoring device 2 (414) has also been previously established and is being maintained.

The connection process by the remote user 400 begins in step 500 and proceeds to step 502 where the remote user 400 uses either a web browser or stand-alone software to log in to a device server 406 connected to the monitoring device of interest (for example, monitoring device 410 in FIG. 1.). In step 504, the user 400 providers a user name or an account ID to the device server 406.

In step 506, the device server 406 uses the user name or account ID to identify the monitoring device 410 associated with that username and contacts that device 410. In step 508, the device server 406 requests from the device 410 a login banner to display to the remote user 400. In accordance with the principles of the invention, almost all user account and configuration info is stored on the actual device 410 and, therefore, the login banner information must be obtained from the device 410.

Next, in step 510, the device server 406 receives the login banner from the device 410 and displays the login banner to the remote user 400, and requests a user response. The login banner may be a simple message requesting that a pin or password be provided, such as "Please log in to your device. For help, contact your alarm dealer, Acme Alarm Company, at 800-555-1212." or the login banner may be a challenge/response question, such as "Please enter your pin number and the year that you were born."

After receiving the response, in step 512, the device server 406 contacts the monitoring device 410 associated with the username/account ID provided by the user 400 and provides the user's response to the login banner to the monitoring device 410. The process then proceeds, via off-page connectors 514 and 516, to step 518 where the device 410 validates the user response.

If the login is valid, as determined by the device 410 in step 520, in step 522, the device 410 supplies the device server 406 with a session token for subsequent call-backs and a list of valid commands that the session will accept. The device server 406, in step 526, takes that session token and command list and returns them to the remote user 400. If the remote user 400 is using a web browser, the device server 406 sets the session token as cookie in the user's web browser and generates an HTML page listing the various commands the user 400 can make.

Once the user 400 is logged in, in step 528, the user 400 and device server 406 can exchange any number of requests and responses. Each request is sent from the device server 406 to the device 410, whose response is then accepted by the device server 406 and forwarded to the user 400. A check is then made in step 530 to determine whether the session has ended. Sessions may end for a variety of reasons; for example, sessions may be restricted to certain times of day, limited in duration and limited to certain types of activities. If the session has not ended, the process returns to step 528 where additional requests and responses are exchanged. If the session has ended, as determined in step 530, then the process ends in step 532.

Alternatively, in step 520, if the device 410 determines that the attempted login to the device server 406 by the remote user 400 is invalid, in step 524, the device 410 takes appropriate action, such as issuing a new login banner, sending an alert or locking out additional login attempts for a predetermined period of time. The process then ends in step 532.

The process shown in FIGS. 5A and 5B has the advantage that the device server 406 is "state-less": it does not matter through which device server subsequent requests are routed, and in the event the device server 406 is compromised, the only data that is accessible at the device server 406 are the bits currently being transmitted. The system can also use software installed directly on a user's computer rather than a web server to access the device. In this case, it is also possible to do end-to-end encryption (using public/private keys exchanged directly between the software and the device) of data passing between the remote user 400 and the monitoring device 410 so that the possibility of accessing bits transmitted through the device server 406 does not even permit a "man-in-the-middle" type attack (recording and later retransmitting data).

The connection of the monitoring device to a network, such as the Internet, allows for utilization of off-premises resources as part of a controller's logic. Data for analysis can be collected by the device on-premises and then transmitted for analysis in a separate system (such as a cluster of powerful high-end servers). This separation allows for more sophisticated processing without requiring the device itself to be able to provide the necessary computational power. For example, off-site computing power could allow a learning/neural network system to be run on the input data to generate an optimal output rule set whereas such a task may be too computationally intensive for a microcontroller CPU, or may require additional datasets that would not fit into the available on-device storage. Further, the monitoring device is able to include remote data in its logic for managing inputs and outputs. For example, in a watering system application, data feeds on forecasted weather conditions can be included in a rule to adjust the duration of a watering event.

Figure 6:
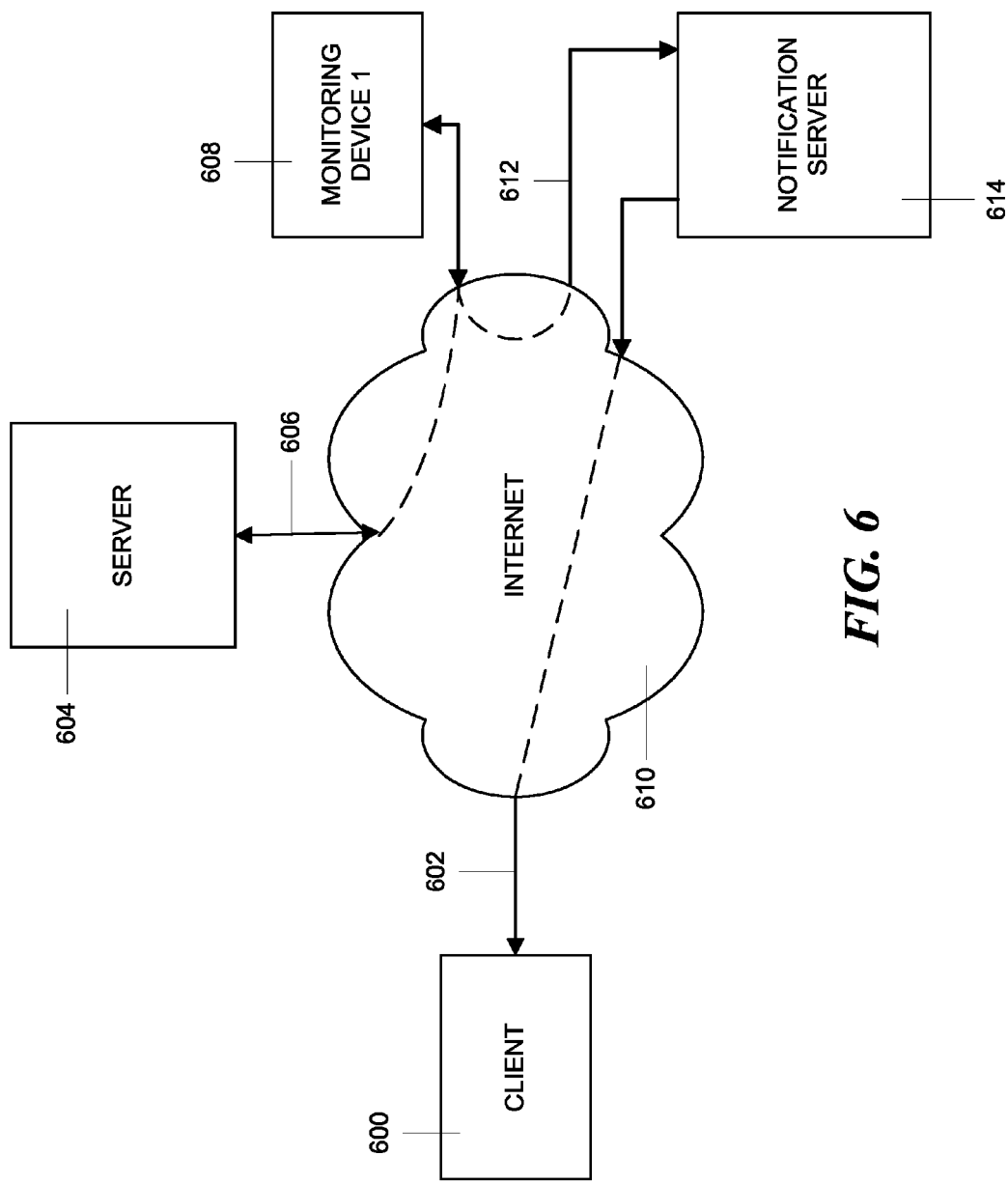
FIG. 6 is a block schematic diagram illustrating the generation of a notification by a monitoring device and transmission of the notification through a randomly selected notification server.
Figure 7:
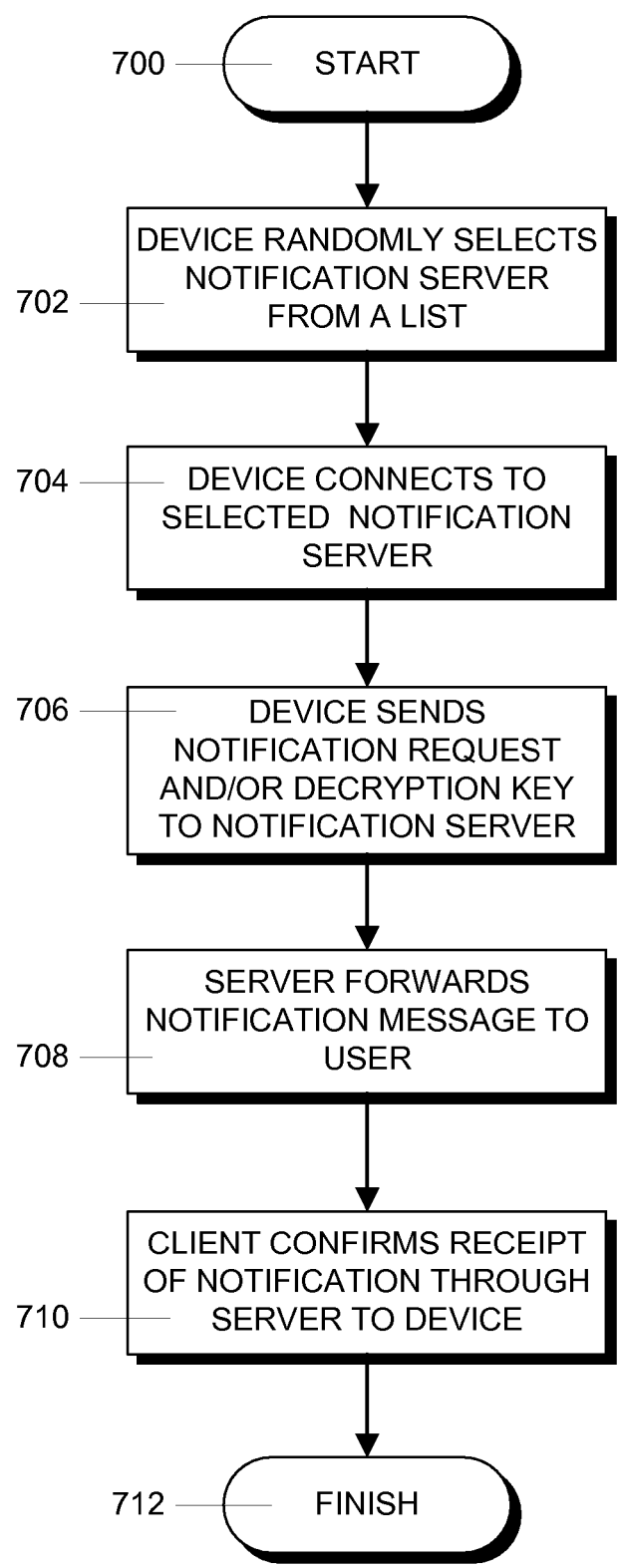
FIG. 7 is a flowchart illustrating the steps in an illustrative process for generating and sending the notification depicted in FIG. 6.

In accordance with another aspect of the invention, the monitoring device can send notifications to various recipients through multiple possible servers. This feature is illustrated in FIG. 6 and the notification process is shown in FIG. 7. In general, a monitoring device 608 sends a notification to a client 600 based on a change in local inputs, or to alert the user that a request was processed from device server 604.

The notification process begins in step 700 and proceeds to step 702. In step 702, if the device 608 enters a state that triggers an alert (such as a tripped alarm), the device 608 contacts one of any number of "notification servers", such as notification server 614. The monitoring device 608 maintains a list of notification servers which it can contact and, in step 702, a notification server is randomly picked from the list. A random selection reduces the probability that an attacker can pick the actual notification server that will be used to send the notification. The notification servers are not connected to each other and are located randomly throughout the Internet 610, such that an attacker cannot easily guess which notification server will handle a notification. Notifications can be sent to client 600 and/or other desired recipients (police, fire, medical). In step 704, the monitoring device 608 connects to the selected notification server 614, via the Internet 610, as indicated schematically by connection 612.

In step 706, the monitoring device 608 sends the notification server 614 a message that is to be relayed to the client 600. Depending upon the client's preferences, this message may be an SMS message, an email, or a voice phone call. The message may be client-settable, such as an audio recording by the client saying "Hi, this is an alert from the house". This client-settable message is used to customize the notification so that the client can verify that the notification is authentic. In particular, if the client does not hear or read their customized text, then the notification was not sent by the legitimate monitoring device 608. The client-settable message is stored only on the monitoring device 608, or in the case of audio recordings, may be stored encrypted on the notification server 614, and the device 608 sends a decryption key only when a notification request is made.

Next, in step 708, the notification server 614 establishes a connection 602 to the client 600 through the Internet 610 and forwards the notification message to the client 600. Depending upon the client preferences, in step 710, the client 600 may be able to interact with the notification server, for example, pressing the '#' button on their phone to acknowledge that they received the notification. For voice phone calls, this acknowledgement is returned to the device 608, via the connection 602 between the notification server 614 and the client 600 and the connection 612 between the notification server 614 and the device 608 and allows the device 608 to confirm that the notification server 614 sent the notification to the client 600. For SMS or email alerts, the acknowledgement will route back through the device server 604. The notification process then finishes in step 712.

Figure 8:
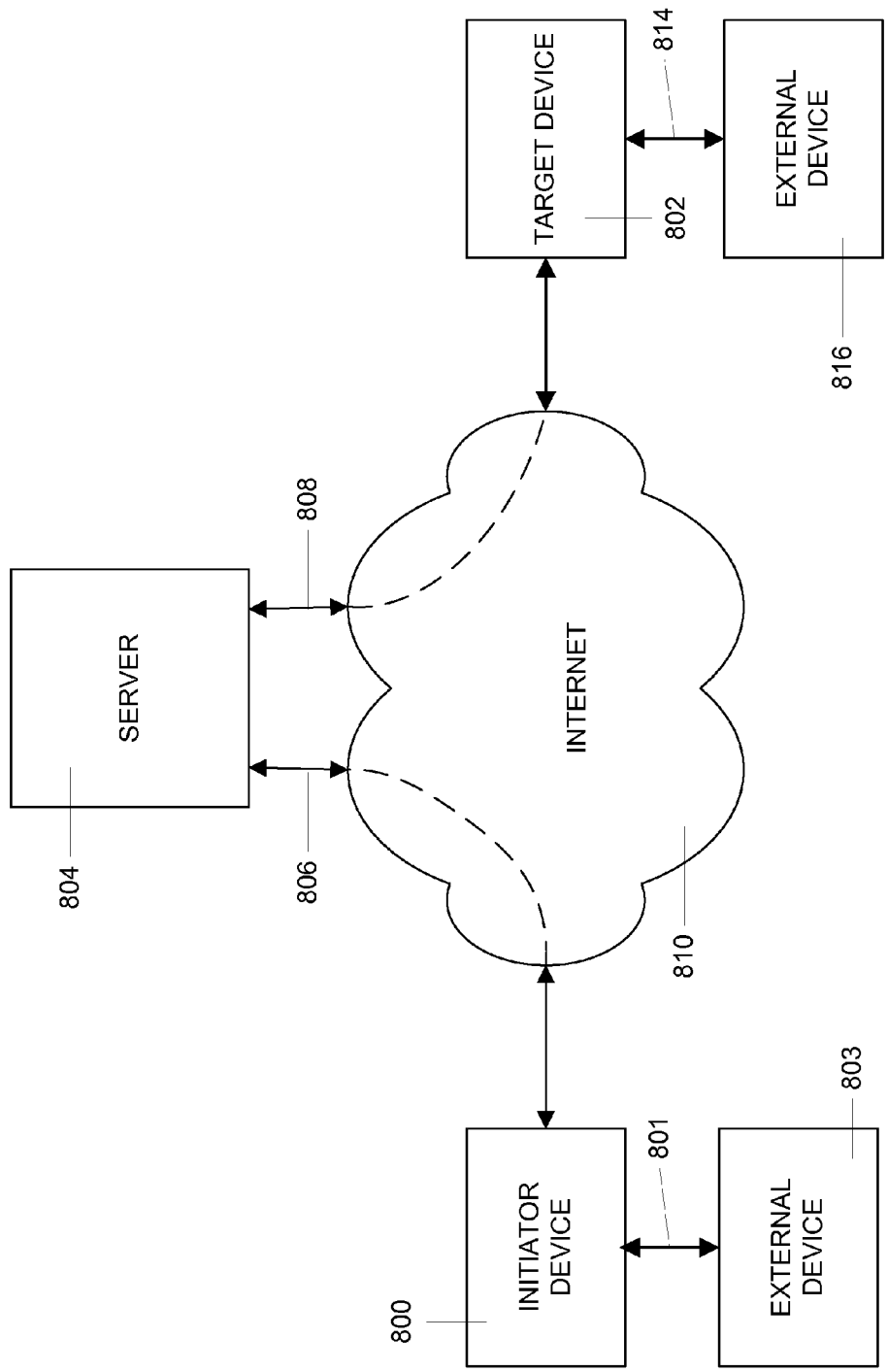
FIG. 8 is a block schematic diagram illustrating the establishment, via a device server, of a device to device connection between an initiator monitoring device and a target monitoring device.
Figure 9A:
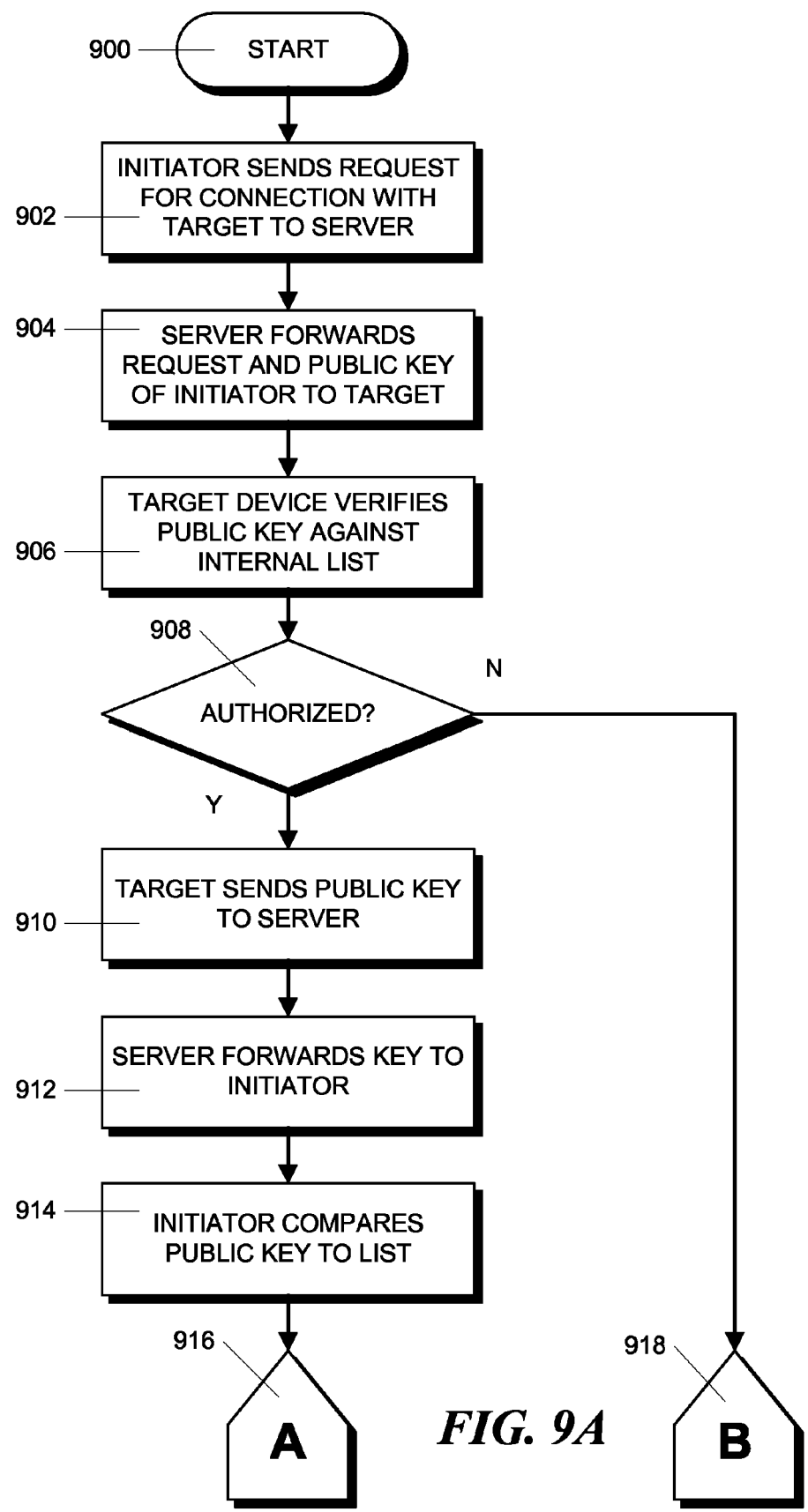
FIGS. 9A and 9B, when placed together, form a flowchart showing the steps in an illustrative process of establishing the device to device connection shown in FIG. 8.
Figure 9B:
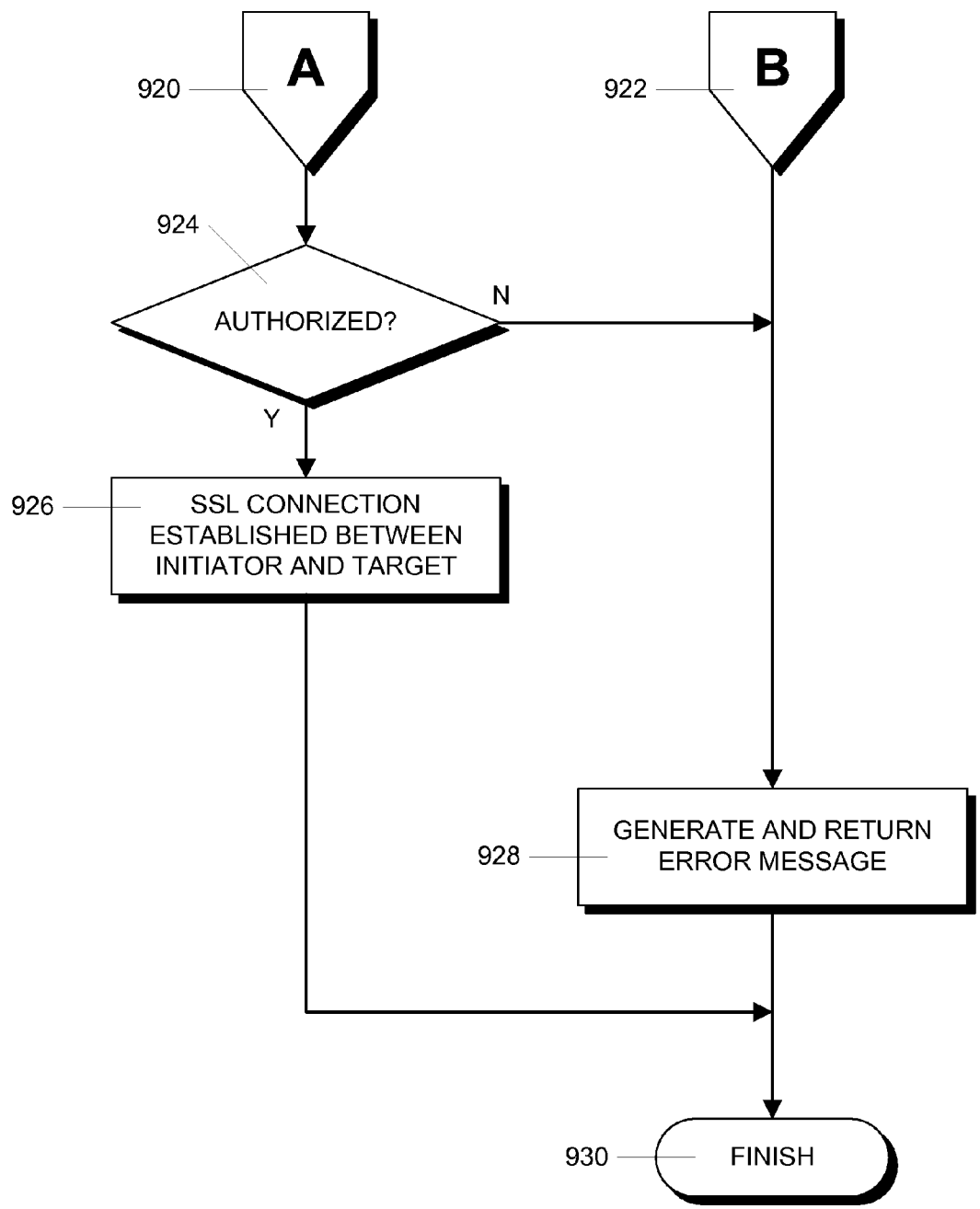

In accordance with still another feature of the invention, one monitoring device, called an "initiator" device can communicate a message to a second monitoring device called a "target" device, via a common device server, without the device server being able to understand, alter, or repeat the message. This feature is illustrated in FIG. 8 and the process of establishing the communication path is shown in FIGS. 9A and 9B. In particular, each monitoring device has a list of "trusted" peers, which list contains the addresses of, and public keys from, other monitoring devices that can be trusted. As shown in FIG. 8, both the initiator device 800 and the target device 802 maintain connections, via the Internet 810 with a device server 804. These connections are established as set forth above and are illustrated in FIG. 8 as connections 806 and 808, respectively.

The process of setting up a device to device connection is shown in FIGS. 9A and 9B. This process begins in step 900 and proceeds to step 902 where the initiator device 800 sends a request to connect to the target device 802 to the device server 804 over the previously-established connection between the device 800 and the device server 804. This request contains the address of the target device 802 and public key of the initiator device 800.

In step 904, the device server 804 forwards the request containing the public key of the initiator device 800 to the target device 802. Then, in step 906, the target device 802 verifies that the public key of the initiator device 800 is on the target device's list of trusted peers. If the connection is not authorized as indicated by the absence of the key on the list as determined in step 908, then, the process proceeds, via off-page connectors 918 and 922, to step 928 where an error message is generated by the target device 802 and forwarded, via the device server, 804, to the initiator device 800. The process then finishes in step 930.

Alternatively, if, in step 908, it is determined that the connection is authorized as indicated by the presence of the key on the list, then the process proceeds to step 910 where the target device 802 sends its public key to the device server 804 via the previously established connection 808. In step 912, the device server 804 forwards the target device public key via the connection 806 to the initiator device 800.

Then, in step 914, the initiator device 800 compares the public key of the target device 802 to the public keys on its trusted device list. The process then proceeds, via off-page connectors 916 and 920, to step 924 where a determination is made whether the connection is authorized. If the connection is not authorized as indicated by the absence of the key on the list as determined in step 924, then, the process proceeds to step 928 where an error message is generated by the initiator device 800 and forwarded, via the device server, 804, to the target device 800. The process then finishes in step 930.

Alternatively, if, in step 924, it is determined that the connection is authorized as indicated by the presence of the key on the list, then the process proceeds to step 926 where an SSL connection is established between the initiator device 700 and the target device 802 in a conventional fashion. The process then finishes in step 930.

Device-to-device communication allows one monitoring device to inform a second monitoring device that a user has pressed the push button on the first device to approve some action. This increases the security of the system because a remote request can be authenticated only by being physically present at the first device. Since the user cannot duplicate this device, the user cannot be tricked into revealing a password. In addition, this process allows access to a target device by an initiator device to be removed by recalling the initiator device (or by removing the initiator device's public key from the trusted device list of the target device).

Device-to-device communication also allows "groups" to be created, which allow one device to "push" configuration changes to multiple other devices. For example, if a company with twenty store locations positions an inventive monitoring device at each store location, one of the devices can be used to configure the other nineteen devices, provided that the public key of that one device is listed as a trusted key in the other nineteen devices.

Such a connection further allows remote programming of an existing monitoring device. This arrangement is shown in FIG. 8 in which an external device 803 is connected, for example, by an RS232 connection 801 to the RS232 port of initiator device 800 and an external device 816 is connected via an RS232 connection 814 to the RS232 port of target device 802. For example, conventional alarm panels are typically configured using specialized software on a laptop computer that is physically brought to the alarm panel location and directly connected to the alarm panel via an RS232 or USB connection.

Using device-to-device communication, a local device RS232 port can be "bridged" to a remote device RS232 port. Thus configuration commands applied to the RS232 port of initiator device 800 by device 803 can be applied via the RS232 port of target device 802 to the external device 816. This bridge is encrypted end-to-end, even if the device server 804 is compromised; it is not possible to hijack the connection. Thus, a person servicing monitoring and control devices could have a programming computer in a central location or office connected to the monitoring and control device 800. This computer can be connected, via monitoring and control devices 800 and 802 to another device 816, which might be an existing alarm panel. This connection makes it appear that the programming computer 803 is "on-site" at the alarm panel location, allowing the computer to program the alarm panel even though the computer is actually remotely located. Thus, there would be no need to send a technician on-site to program the existing panel. Other types of bridges connections, such as USB connections are also possible using the same bridging mechanism, A software implementation of the above-described embodiment may comprise a series of computer instructions either fixed on a tangible medium, such as a computer readable media, for example, a diskette, a CD-ROM, a ROM, or a fixed disk, or transmittable to a computer system via a modem or other interface device over a transmission path and stored on the system. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices. It is contemplated that such a computer program product may be distributed as a removable medium with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, process operations different from those shown may be performed. Other aspects, such as the specific process flow and the order of the illustrated steps, as well as other modifications to the inventive concept are intended to be covered by the appended claims.

What is claimed is:

1. A method for establishing a secure communication path between a remote user and a monitoring and control device over an unsecure network and through a server comprising:
   (a) using the device to establish and maintain an encrypted communication path to the server;
   (b) receiving device identification information from the user over the network at the server;
   (c) identifying and contacting the device with the server over the encrypted communication path using the device identification information; and
   (d) exchanging login information between the device and the user over the network and through the server whereupon the device authenticates the user and allows the user to connect to the device;
   (d1) requesting at the server an authentication banner from the device and displaying the banner to the user;
   (d2) relaying a user response to the banner through the server to the device; and
   (d3) validating the user response with the device.

2. The method of claim 1 wherein step (d) comprises detecting the physical manipulation of an object located on the device.

3. The method of claim 1 wherein step (a) comprises:
   (a1) installing the device at an operating location;
   (a2) connecting the installed device to the network;
   (a3) after connection to the network, connecting the device via the network to a server at a predetermined network address with the encrypted network connection;
   (a4) forwarding a unique device ID from the device to the server;
   (a5) pairing the unique device ID with an account ID at the server and storing the device ID and account ID pair at the server; and
   (a6) maintaining a persistent encrypted network connection.

4. The method of claim 3 wherein step (c) comprises receiving an account ID from the user, locating the device ID from device ID and account ID pairs stored at the server and using the device ID to contact the device.

5. A method for verifying the existence of a connection between a monitoring and control device and a first server by a second system, comprising:
   (a) sending a challenge token from the second system to the first server;
   (b) at the first server and in response to the challenge token, sending the challenge token to the device over the connection;
   (c) cryptographically signing the challenge token at the device and returning the signed challenge token to the first server over the connection; and
   (d) forwarding the challenge token from the first server to the second system and verifying the challenge token was generated by the device at the second system;
   (d1) requesting at the server an authentication banner from the device and displaying the banner to the user;
   (d2) relaying a user response to the banner through the server to the device; and
   (d3) validating the user response with the device.

6. The method of claim 5 wherein step (c) comprises signing the challenge token with a private key of a public/private key pair stored at the device.

7. The method of claim 6 wherein step (d) comprises verifying the challenge token with a public key of the public/private key pair.

8. The method of claim 5 wherein the device establishes the connection with the first server.

9. A method for establishing a secure connection between an initiator device having a key associated therewith and a target device having a key associated therewith via a server, the method comprising:
   (a) creating an initiator list of keys associated with allowed devices in the initiator monitoring device;
   (b) creating a target list of keys associated with allowed devices in the target monitoring device;
   (c) sending, via the server, a connection request to connect to the target device and the initiator device key from the initiator device to the target device;
   (d) in the target device, and in response to the connection request, comparing the received key against the target list of allowed devices;
   (e) when the initiator device key is on the target list, sending, via the server, the key of the target device to the initiator device;

(f) in the initiator device, comparing the received key against the initiator list of allowed devices; and
(g) when the target device key is on the initiator list, establishing through the server an encrypted connection between the initiator and target devices.

10. The method of claim 9 wherein the keys associated with the initiator and target devices are public keys of public/private key pairs.

11. The method of claim 9 wherein the encrypted connection is performed with public/private key pairs.

12. The method of claim 9 wherein the initiator device has a control interface and the target device has an identical control interface and wherein the method further comprises generating commands at the initiator device control interface, sending the commands over the encrypted connection and controlling the target device control interface to generate commands identical to the commands generated at the initiator device control interface.

13. The method of claim 9 further comprising means for configuring the initiator device to forward configuration commands to one or more target devices in order to synchronize all or parts of the initiator device's configuration to the target device(s).

14. A method for sending a notification from a monitoring and control device to a remote recipient, the method comprising:
(a) in response to a change, using the device to select a notification server randomly from a list including a plurality of servers stored in the device;
(b) connecting the device to the selected server;
(c) sending a notification request to the server; and
(d) at the server, in response to the notification request, sending a notification message to the recipient;
(d1) requesting at the server an authentication banner from the device and displaying the banner to the user;
(d2) relaying a user response to the banner through the server to the device; and
(d3) validating the user response with the device.

15. The method of claim 14 wherein, in step (d), the notification message is stored only in the device.

16. The method of claim 14 wherein step (d) comprises sending an audio notification message to the user.

17. The method of claim 16 wherein step (d) comprises playing an audio notification message generated by the user and storing the recorded audio message on the server.

18. The method of claim 17 wherein step (d) comprises storing the recorded audio message on the server in encrypted form.

19. The method of claim 14 further comprising receiving at the notification server an acknowledgement that the user received the notification message.

20. Apparatus for establishing a secure communication path between a remote user and a monitoring and control device over an unsecure network and through a server comprising:
a mechanism in the device that establishes and maintains an encrypted communication path to the server;
means for receiving device identification information from the user over the network at the server;
means in the server for identifying and contacting the device over the encrypted communication path using the device identification information; and
a login mechanism that exchanges login information between the device and the user over the network and through the server wherein the device authenticates the user and allows the user to connect to the device;
a mechanism in the server that requests an authentication banner from the device and displays the banner to the user;
a mechanism in the server that relays a user response to the banner through the server to the device; and
a mechanism in the device that validates the user response.

21. The apparatus of claim 20 wherein the login mechanism comprises a controller in the device that detects the physical manipulation of an object located on the device.

22. The apparatus of claim 20 wherein the login mechanism comprises:
means for installing the device at an operating location;
an adapter that connects the installed device to the network;
means operable after connection to the network, for connecting the device via the network to a server at a predetermined network address with the encrypted network connection;
a mechanism that forwards a unique device ID from the device to the server;
means at the server for pairing the unique device ID with an account ID and storing the device ID and account ID pair at the server; and
means for maintaining a persistent encrypted network connection.

23. The apparatus of claim 22 wherein the means for identifying and contacting the device over the encrypted communication path using the device identification information comprises means for receiving an account ID from the user, means for locating the device ID from device ID and account ID pairs stored at the server and means for using the device ID to contact the device.

24. Apparatus for verifying the existence of a connection between a monitoring and control device and a first server by a second system, comprising:
means for sending a challenge token from the second system to the first server;
means at the first server that responds to the challenge token, by sending the challenge token to the device over the connection;
a signing mechanism that cryptographically signs the challenge token at the device and returns the signed challenge token to the first server over the connection;
and means for forwarding the challenge token from the first server to the second system and for verifying the challenge token was generated by the device at the second system;
a mechanism in the server that requests an authentication banner from the device and displays the banner to the user;
a mechanism in the server that relays a user response to the banner through the server to the device; and
a mechanism in the device that validates the user response.

25. The apparatus of claim 24 wherein the signing mechanism comprises means for signing the challenge token with a private key of a public/private key pair stored at the device.

26. The apparatus of claim 25 wherein the means for verifying the challenge token was generated by the device comprises means for verifying the challenge token with a public key of the public/private key pair.

27. The apparatus of claim 24 wherein the device comprises a mechanism that establishes the connection with the first server.

28. Apparatus for establishing a secure connection between an initiator device having a key associated therewith and a target device having a key associated therewith via a server, the apparatus comprising:

in the initiator monitoring device, an initiator list of keys associated with allowed devices;

in the target monitoring device, a target list of keys associated with allowed devices;

means for sending, via the server, a connection request to connect to the target device and the initiator device key from the initiator device to the target device;

means in the target device, that responds to the connection request, by comparing the received key against the target list of allowed devices;

means operable when the initiator device key is on the target list, for sending, via the server, the key of the target device to the initiator device;

means in the initiator device, for comparing the received key against the initiator list of allowed devices; and means operable when the target device key is on the initiator list, for establishing through the server an encrypted connection between the initiator and target devices.

29. The apparatus of claim 28 wherein the keys associated with the initiator and target devices are public keys of public/private key pairs.

30. The apparatus of claim 28 wherein the encrypted connection is performed with public/private key pairs.

31. The apparatus of claim 28 wherein the initiator device has a control interface and the target device has an identical control interface and wherein the apparatus further comprises means for generating commands at the initiator device control interface, means for sending the commands over the encrypted connection and means for controlling the target device control interface to generate commands identical to the commands generated at the initiator device control interface.

32. The apparatus of claim 28 further comprising means for configuring the initiator device to forward configuration commands to one or more target devices in order to synchronize all or parts of the initiator device's configuration to the target device(s).

33. Apparatus for sending a notification from a monitoring and control device to a remote recipient, the apparatus comprising:

means in the device that responds to a change by selecting a notification server randomly from a list including a plurality of servers stored in the device;

means for connecting the device to the selected server;

means for sending a notification request to the server; and means at the server, that responds to the notification request, by sending a notification message to the recipient;

a mechanism in the server that requests an authentication banner from the device and displays the banner to the user;

a mechanism in the server that relays a user response to the banner through the server to the device; and a mechanism in the device that validates the user response.

34. The apparatus of claim 33 wherein the notification message is stored only in the device.

35. The apparatus of claim 33 wherein the means that sends a notification message to the user comprises means for sending an audio notification message to the user.

36. The apparatus of claim 35 wherein the means that sends a notification message to the user comprises means for playing an audio notification message generated by the user and means for storing the recorded audio message on the server.

37. The apparatus of claim 36 wherein the means for storing the recorded audio message on the server comprises means for storing the recorded audio message on the server in encrypted form.

38. The apparatus of claim 33 further comprising means for receiving at the notification server an acknowledgement that the user received the notification message.

* * * * *